F. H. SCHUTTER.
PLANTER.
APPLICATION FILED JULY 1, 1919.

1,343,286.

Patented June 15, 1920.
2 SHEETS—SHEET 1

WITNESSES

INVENTOR
F. H. SCHUTTER
BY
ATTORNEYS

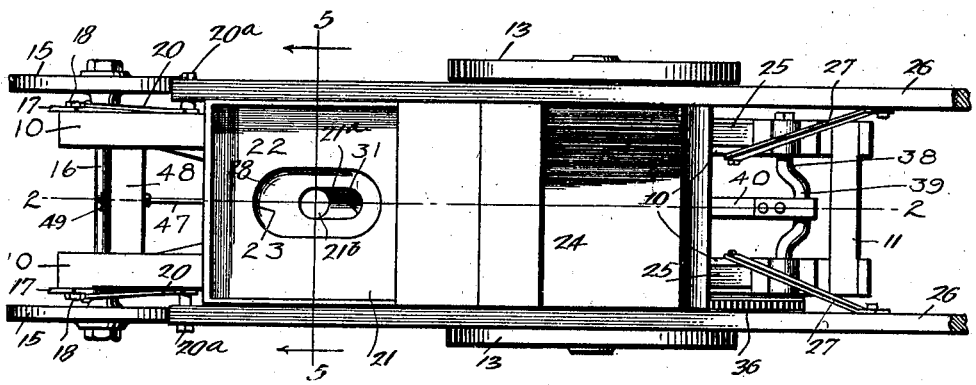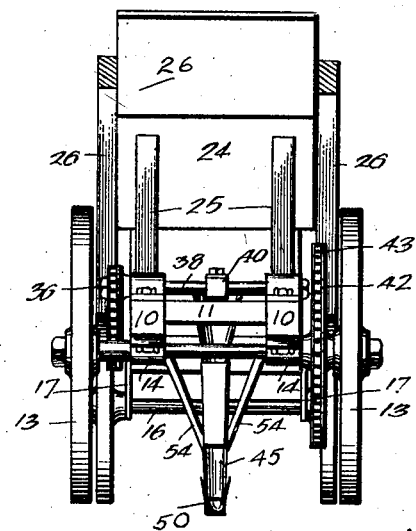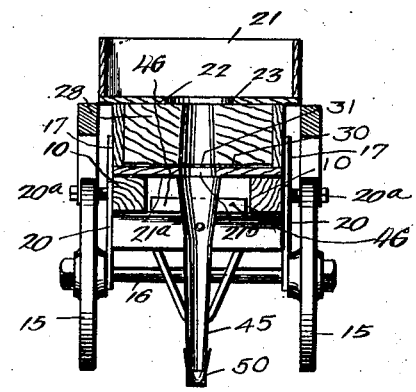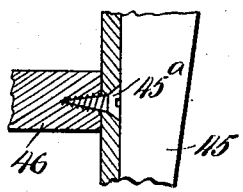

UNITED STATES PATENT OFFICE.

FRED H. SCHUTTER, OF PLEASANT VALLEY, IOWA.

PLANTER.

1,343,286.     Specification of Letters Patent.     Patented June 15, 1920.

Application filed July 1, 1919. Serial No. 308,051.

*To all whom it may concern:*

Be it known that I, FRED H. SCHUTTER, a citizen of the United States, and a resident of Pleasant Valley, in the county of Scott and State of Iowa, have invented certain new and useful Improvements in Planters, of which the following is a specification.

My invention relates to planters and has reference more particularly to planters for planting onion sets.

An object of the invention is to provide means whereby a greater number of onion sets can be planted in a relatively short space of time.

Another object of the invention is to provide a planter which will permit a great number of sets being planted in a given time by one person, thus releasing other help for other duties.

Another object is to provide an onion planter that is simple in construction, positive and efficient in operation, and one that can be cheaply made, thus placing it within reach of every farmer.

With these and other objects in view, the invention consists in certain novel features of construction, arrangement and combination of parts as will be hereinafter fully described and pointed out in the claims, reference being had to the accompanying drawings in which:

Fig. 3 is a top plan view,

Fig. 4 is a rear end view with handles in section,

Fig. 5 is a vertical transverse section on the line 5—5 of Fig. 3.

Fig. 6 is an enlarged detail showing connection between spout and adjusting beam.

Figure 1:
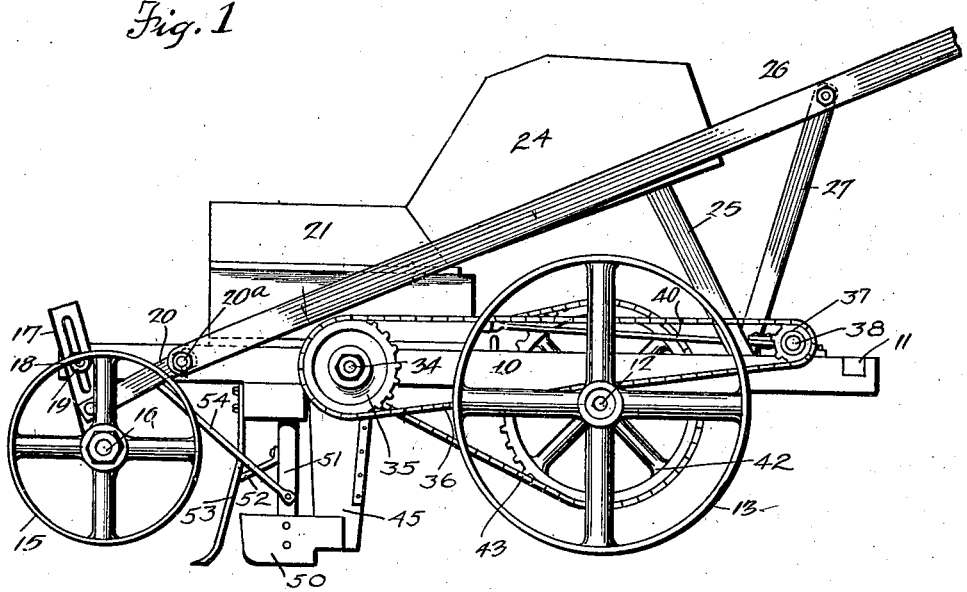
Figure 1 is a side elevation of the improvement.
Figure 2:
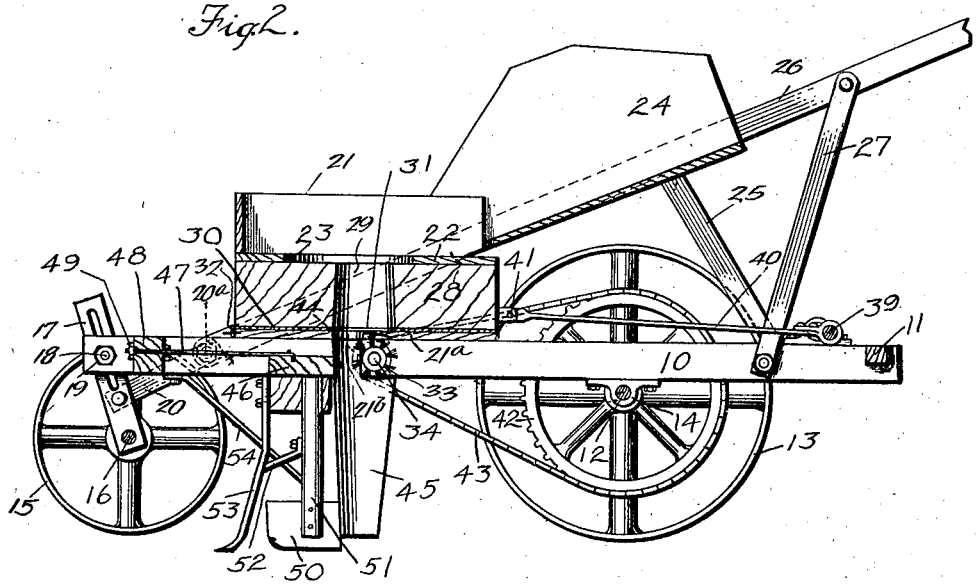
Fig. 2 is a longitudinal section thereof taken on the line 2—2 of Fig. 3.

In carrying into effect my improvements, I use a frame consisting of side beams 10 connected at the rear by cross beam 11 and mounted on the axle 12 carrying ground wheels 13, by suitable bearing boxes 14. The forward end of the frame is attached to smaller wheels 15 carried on an axle 16 which is adjustably suspended from the frame by slotted arms 17 secured at their lower ends to the axle and passing up along the outside of the side bars 10 are connected therewith by bolts 18 passing through the slots, and the ends of the side bars and nuts 19 screwed on said bolts; these arms are disposed at an angle to the vertical line of the axle and are themselves suspended from the side bars by strap links 20 which are pivotally bolted at one end to the side bars 10 by bolts 20$^a$ and at their opposite ends to the slotted arms 17.

Mounted on the frame is the seed box 21 occupying the entire width of the frame, said box being open at its top, front and rear ends and having therein a horizontal partition 22 having an elongated or oval opening 23; a hopper 24 having an inclined bottom extends rearwardly and upwardly from the rear end of seed box 21 and is supported at its rear end on the oblique props or bars 25 secured to the frame. The diagonal handles 26 are rigidly connected to the frame at their front ends adjacent the seed feed box and supported by braces 27, the front ends being mounted on the same bolts that secure the strap links 20 to the frame.

Mounted to slide in the feed box is a shaker slide 28, having an oval opening 29 therethrough and beneath the opening 23 in the partition 22; but this opening 29 is somewhat smaller than the opening 23 both laterally and longitudinally; that is, the major and minor axes of the opening 23. The bottom of the seed box 21$^a$ also has an opening, 21$^b$ which is round and smaller than either of the before-mentioned openings, and fitted on the bottom of the seed box is a metal gage plate 30 which has an opening 31 therethrough and in alinement with the aforesaid openings in the partition shaker slide and seed box bottom; this metal plate is secured to the seed box by a lip 32 at one end bent downwardly and secured to the box by screws or other suitable means, the function of this plate being to permit the shaker slide to work freely as the plate becomes highly polished, and to permit of planting thicker or thinner by taking out the metal plate and making the opening therein larger or smaller, or by putting in different plates having different sized holes therein.

Beneath the bottom opening and plate is mounted a rotary brush 33 carried on a transverse shaft 34 mounted in the frame and on this shaft is secured a sprocket wheel 35 engaged by a sprocket chain 36 which extending rearwardly, engages a sprocket wheel 37 mounted on a crank shaft 38 having a single crank 39 to which is coupled one end of a pitman 40, the opposite end of said pitman being detachably connected to the rear end of the shaker slide by a cotter pin 41 or other suitable means.

Carried on the axle 12 is a relatively large sprocket wheel 42 carrying a sprocket chain 43 which runs to and drives a smaller sprocket wheel 44 mounted on the rotary brush shaft 34, so that the said brush is driven forwardly with considerable speed; the sprocket wheel 35 which is on the opposite end of the brush shaft is larger than the sprocket which drives the brush, and from this sprocket the crank shaft is rapidly rotated so that a rapid reciprocating movement is given to the shaker slide 28.

Beneath the seed box is adjustably mounted the spout 45 which is secured at its upper end by suitable means such as a bolt 45$^a$ to the cross beam 46 slidably held between the side beams; this cross beam carrying the spout is slidable longitudinally of the frame by means of the screw rod 47 which passes through a rigid cross head 48, and is controlled by a winged nut 49; the spout carries at its lower end a furrow shoe 50 which is supported by bar 51 secured to the frame, and connected to the bar 51 by a brace rod 52 is the furrow opener 53 the lower end of which is bent and sharpened, the upper end of the furrow opener being secured to the framework of the planter, and prevented from lateral movement by guy rods 54.

By adjusting the top of the spout 45 closer to the brush, the planting will be thinner and by manipulating the screw rod and drawing the top of the spout farther from the brush the planting will of course be thicker.

The purpose of the rotary brush is to hold the drop sets even.

The walls of the opening in the shaker slide incline out downwardly so that the opening is larger at the bottom than at the top, by which construction the sets are prevented from getting stuck in the shaker and as the bottom of the hopper is on a slant the sets will be fed as fast as the shaker takes them away, the shaker reciprocating fast enough to keep them from clogging.

By the mechanism hereinbefore set forth, the planter puts the sets in a very narrow row, rendering it very easy to wheel hoe the rows.

I claim:

1. In a device of the character specified, the combination with a seed box having a perforated bottom, a perforated shaker slide mounted to reciprocate therein, and drop the seed through said bottom, a delivery spout mounted below said seed box and adapted to receive the seed from the shaker slide, and a rotating horizontal brush mounted in the upper end of said spout, beneath the bottom opening.

2. In a device of the character specified and comprising a seed box, a perforated reciprocating shaker slide therein, and a discharge opening in the bottom of the seed box, a discharge spout having its upper end horizontally adjustably mounted with respect to the feed box and adjacent the discharge opening in the bottom thereof.

3. In a device of the character herein specified, and comprising a seed box, a perforated shaker slide longitudinally reciprocable therein, said box having a discharge opening in the bottom thereof, a discharge spout having its upper end horizontally adjustably mounted with respect to the feed box and adjacent said bottom opening, and a rotating regulating brush mounted below said bottom opening and within the upper portion of the said spout.

4. A device of the character herein specified, comprising in combination a seed box, an inclined feed hopper thereon, a perforated partition in said feed box, said box having a discharge opening through the bottom thereof, a shaker slide mounted to reciprocate within the feed box between the aforesaid partition, and the bottom, said shaker slide having an oval opening therethrough, the lower end of which is of greater area than the upper end, a removable wear plate having a discharge opening in vertical alinement with the openings in the partition, shaker slide and bottom opening, and a discharge spout having its upper end mounted to be adjusted in a horizontal plane adjacent the said bottom opening.

5. In a device as herein characterized, the combination with a seed feed box, having a reciprocable perforated shaker slide therein, and discharge opening in the bottom thereof, of a discharge spout having its upper end adjacent said discharge opening, a rotary brush mounted to revolve forwardly within the upper end of said spout, said upper end of the spout horizontally adjustable to and from the periphery of said brush.

FRED H. SCHUTTER.